(12) United States Patent
Fu et al.

(10) Patent No.: US 9,491,719 B2
(45) Date of Patent: Nov. 8, 2016

(54) METHOD, SYSTEM AND APPARATUS FOR POWER HEADROOM REPORT

(71) Applicant: CHINA ACADEMY OF TELECOMMUNICATIONS TECHNOLOGY, Beijing (CN)

(72) Inventors: Zhe Fu, Beijing (CN); Guoqing Li, Beijing (CN); Yali Zhao, Beijing (CN); Nan Yan, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 19 days.

(21) Appl. No.: 14/405,359

(22) PCT Filed: Jun. 4, 2013

(86) PCT No.: PCT/CN2013/076715
§ 371 (c)(1),
(2) Date: Dec. 3, 2014

(87) PCT Pub. No.: WO2013/182039
PCT Pub. Date: Dec. 12, 2013

(65) Prior Publication Data
US 2015/0131567 A1    May 14, 2015

(30) Foreign Application Priority Data
Jun. 4, 2012 (CN) .......................... 2012 1 0181849

(51) Int. Cl.
*H04W 52/36* (2009.01)
*H04W 72/04* (2009.01)
(Continued)

(52) U.S. Cl.
CPC ....... *H04W 52/365* (2013.01); *H04W 72/0413* (2013.01); *H04L 5/00* (2013.01); *H04L 5/0058* (2013.01); *H04L 5/0094* (2013.01); *H04L 2025/03802* (2013.01)

(58) Field of Classification Search
None
See application file for complete search history.

(56) References Cited

U.S. PATENT DOCUMENTS

2010/0272091 A1* 10/2010 Fabien ................ H04W 52/365
370/345
2010/0273515 A1* 10/2010 Fabien .................... H04L 5/006
455/509

(Continued)

FOREIGN PATENT DOCUMENTS

CN        1968446        5/2007
CN      101895923      11/2010

(Continued)

OTHER PUBLICATIONS

International Search Report for PCT/CN2013/076715 mailed Sep. 5, 2013.

(Continued)

*Primary Examiner* — Andrew Oh
(74) *Attorney, Agent, or Firm* — Foley & Lardner LLP; James F. Ewing; Paul M. H. Pua

(57) ABSTRACT

Embodiments of the present invention relate to wireless communication technology field, especially relate to a method, system and apparatus for power headroom report, for the use of power headroom report when a User Equipment (UE) aggregates carriers under different enhanced NodeBs (eNBs). Embodiments of the present invention provide a method for power headroom report, including: a user equipment which aggregates resources of multiple network equipment determines power headroom information; said user equipment sends said power headroom information to at least one of the network equipment participating in aggregation. Because the user equipment which aggregates resources of multiple network equipment reports the power headroom information to at least one of the network equipment participating in aggregation, sequentially the power headroom information is enabled to be reported when the UE aggregates carriers under different eNBs, multiple eNBs further can obtain the power headroom information in the case of inter-eNBs-aggregation, and resource scheduling is enabled.

16 Claims, 2 Drawing Sheets

---

401 — The user equipment for which resources of a plurality of network side apparatuses are aggregated determines power headroom information 402 — The user equipment transmits the power headroom information to at least one of the network side apparatuses participating in aggregation

(51) Int. Cl.
*H04L 5/00* (2006.01)
*H04L 25/03* (2006.01)

(56) References Cited

U.S. PATENT DOCUMENTS

| | | | | |
|---|---|---|---|---|
| 2011/0080881 A1* | 4/2011 | Hsu | H04W 52/365 | 370/329 |
| 2011/0092217 A1* | 4/2011 | Kim | H04W 52/367 | 455/450 |
| 2011/0134774 A1* | 6/2011 | Pelletier | H04W 52/365 | 370/252 |
| 2011/0170495 A1* | 7/2011 | Earnshaw | H04W 72/02 | 370/329 |
| 2011/0292874 A1 | 12/2011 | Ho et al. | | |
| 2012/0044882 A1* | 2/2012 | Kim | H04L 5/00 | 370/329 |
| 2012/0082043 A1* | 4/2012 | Hwang | H04L 5/001 | 370/252 |
| 2012/0113848 A1* | 5/2012 | Kim | H04W 52/365 | 370/252 |
| 2012/0127933 A1* | 5/2012 | Worrall | H04W 52/367 | 370/329 |
| 2012/0196645 A1* | 8/2012 | Kim | H04W 52/36 | 455/524 |
| 2012/0207040 A1* | 8/2012 | Comsa | H04W 72/1215 | 370/252 |
| 2012/0302245 A1* | 11/2012 | Huang | H04W 36/0027 | 455/438 |
| 2013/0148535 A1* | 6/2013 | Baghel | H04L 1/0026 | 370/252 |
| 2013/0215824 A1* | 8/2013 | Wang | H04L 5/001 | 370/328 |
| 2013/0215849 A1* | 8/2013 | Heo | H04W 52/365 | 370/329 |
| 2013/0223406 A1* | 8/2013 | Vujcic | H04L 5/001 | 370/331 |
| 2013/0235858 A1* | 9/2013 | Zhao | H04W 56/00 | 370/336 |
| 2013/0244640 A1* | 9/2013 | Viorel | H04W 56/0005 | 455/422.1 |
| 2014/0016593 A1* | 1/2014 | Park | H04L 5/001 | 370/329 |
| 2014/0018124 A1* | 1/2014 | Ahn | H04W 24/10 | 455/522 |
| 2014/0023010 A1* | 1/2014 | Loehr | H04W 52/365 | 370/329 |

FOREIGN PATENT DOCUMENTS

| | | |
|---|---|---|
| CN | 101931992 | 12/2010 |
| CN | 102123437 A | 7/2011 |
| CN | 102439895 A | 5/2012 |
| EP | 2400803 | 12/2011 |
| WO | WO-2011/122910 A2 | 10/2011 |

OTHER PUBLICATIONS

Supplementary European Search Report for EP 13801098 dated Jul. 8, 2015.

* cited by examiner

METHOD, SYSTEM AND APPARATUS FOR POWER HEADROOM REPORT

This application is a US National Stage of International Application No. PCT/CN2013/076715, filed on Jun. 4, 2013, designating the United States, and claiming the benefit of Chinese Patent Application No. 201210181849.4, filed with the Chinese Patent Office on Jun. 4, 2012 and entitled "Method of and system and apparatus for reporting power headroom", which is hereby incorporated by reference in its entirety.

FIELD OF THE INVENTION

The present invention relates to the field of communications and particularly to a method of and system and apparatus for reporting power headroom.

BACKGROUND OF THE INVENTION

There are significantly improved required peak rates of a Long Term Evolution-Advanced (LTE-A) system up to 1 Gbps in the downlink and 500 Mbps in the uplink as compared with an LTE system. Also the LTE-A system is required to be well compatible with the LTE system. Carrier Aggregation (CA) has been introduced to the LTE-A system to thereby accommodate the improved peak rates, compatibility with the LTE system and full use of spectrum resources as needed.

With carrier aggregation, a User Equipment (UE) can operate concurrently on a plurality of cells, where these cells can be consecutive or inconsecutive in frequency, and bandwidths of the respective cells may be the same or different. There is a limited bandwidth up to 20 MHz of each cell for compatibility with the LTE system, and the number of cells that can be aggregated for one user equipment is typically up to 5 at present.

In the carrier aggregation-enabled system, all the cells configured by an evolved Node B (eNB) for the user equipment are referred to as serving cells, but all the functions of the different serving cells may not be the same, so the serving cells are further categorized in the LTE-A system as follows:

A Primary Cell (PCell), where only one of the plurality of cells aggregated for the user equipment is defined as a PCell selected by the evolved Node B and configured to the user equipment via Radio Resource Control (RRC) signaling. A Physical Uplink Control Channel (PUCCH) is configured only on the PCell; and A Secondary Cell (SCell), where all the other cells than the PCell aggregated for the user equipment are SCells.

Power Headroom (PH) information for configured and activated cells needs to be reported in a Power Headroom Report (PHR) defined in the LTE-A Release 10 (R10), that is, the PH information for all the configured and activated cells is packaged and reported once the PHR is triggered.

Only aggregation of carriers controlled by the same eNB for the UE is supported in the LTE-A R10 and earlier releases, and also only aggregation of carriers controlled by the same eNB for the UE is supported in the existing PHR mechanism. If carriers controlled by different eNBs can be aggregated for the UE in later releases than the LTE-A R10, then the existing PHR mechanism can not be applicable any longer.

In summary, there has been absent so far a solution to reporting power headroom in the scenario where carriers controlled by different eNBs are aggregated for the UE.

SUMMARY OF THE INVENTION

Embodiments of the invention provide a method of and system and apparatus for reporting power headroom so as to report power headroom in the scenario where carriers controlled by different eNBs are aggregated for a UE.

An embodiment of the invention provides a method of reporting power headroom, the method including:

a user equipment for which resources of a plurality of network side apparatuses are aggregated determining power headroom information; and the user equipment transmitting the power headroom information to at least one of the network side apparatuses participating in aggregation.

An embodiment of the invention provides another method of reporting power headroom, the method including:

a network side apparatus receiving power headroom information reported by a user equipment for which resources of a plurality of network side apparatuses are aggregated; and the network side apparatus performing scheduling according to the power headroom information.

An embodiment of the invention provides a user equipment for reporting power headroom, the user equipment including:

a determining module configured to determine power headroom information after resources of a plurality of network side apparatuses are aggregated for the user equipment; and a reporting module configured to transmit the power headroom information to at least one of the network side apparatuses participating in aggregation.

An embodiment of the invention provides a network side apparatus for reporting power headroom, the network side apparatus including:

a receiving module configured to receive power headroom information reported by a user equipment for which resources of a plurality of network side apparatuses are aggregated; and a processing module configured to perform scheduling according to the power headroom information.

An embodiment of the invention provides a system for reporting power headroom, the system including:

a user equipment, for which resources of a plurality of network side apparatuses are aggregated, configured to determine power headroom information and to transmit the power headroom information to at least one of the network side apparatuses participating in aggregation; and the network side apparatus configured to receive the power headroom information reported by the user equipment for which the resources of the plurality of network side apparatuses are aggregated and to perform schedule according to the power headroom information.

An embodiment of the invention provides a user equipment for reporting power headroom, the user equipment including:

a processor configured to determine power headroom information after resources of a plurality of network side apparatuses are aggregated for the user equipment; and a signal transmitter configured to transmit the power headroom information to at least one of the network side apparatuses participating in aggregation.

An embodiment of the invention provides a network side apparatus for reporting power headroom, the network side apparatus including:

a signal receiver configured to receive power headroom information reported by a user equipment for which resources of a plurality of network side apparatuses are aggregated; and a processor configured to perform scheduling according to the power headroom information.

The user equipment for which resources of a plurality of network side apparatuses are aggregated reports power headroom information to at least one of the network side apparatuses participating in aggregation so that the power headroom information can be reported in the scenario where carriers controlled by different eNBs are aggregated for the UE and further the plurality of evolved Node B's with aggregation therebetween can obtain the power headroom information to schedule the resources.

DETAILED DESCRIPTION OF THE EMBODIMENTS

In embodiments of the invention, a user equipment for which resources of a plurality of network side apparatuses are aggregated reports power headroom information to at least one of the network side apparatuses participating in aggregation. Since the user equipment for which the resources of the plurality of network side apparatuses are aggregated reports the power headroom information to at least one of the network side apparatuses participating in aggregation, the power headroom information can be reported in the scenario where carriers controlled by different eNBs are aggregated for the UE.

The embodiments of the invention will be described below in further details with reference to the drawings.

In the following description, firstly an implementation with cooperation of the network side and the user equipment side will be described, and then implementations at the network side and the user equipment side will be described respectively, but this will not suggest required cooperation of both the sides for an implementation, and in fact, problems present respectively at the network side and the user equipment side will also be addressed in the separate implementations at the network side and the user equipment side, although a better technical effect can be achieved in the implementation with cooperation of both the sides.

Figure 1:
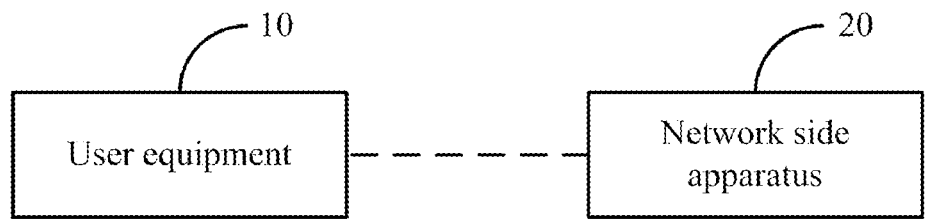
FIG. 1 is a schematic structural diagram of a system for reporting power headroom according to an embodiment of the invention.

As illustrated in FIG. 1, a system for making a buffer state report according to an embodiment of the invention includes a user equipment 10 and a network side apparatus 20.

The user equipment 10 is configured to determine power headroom information and to transmit the power headroom information to at least one of network side apparatuses participating in aggregation, where resources of the plurality of network side apparatuses are aggregated for the user equipment 10; and The network side apparatus 20 is configured to receive the power headroom information reported by the user equipment for which the resources of the plurality of network side apparatuses are aggregated and to perform schedule according to the power headroom information.

In an implementation, the user equipment 10 may determine the power headroom information from a parameter configured by the network side apparatus (e.g., a macro Node B or a home Node B), where the network side apparatus may determine the configured parameter alone or may determine the configured parameter by negotiating with the other network side apparatuses participating in aggregation.

In an implementation, the network side apparatus 20 may perform scheduling according to the power headroom information as defined in the 3GPP TS 36.321 protocol, so a repeated description thereof will be omitted here.

In an implementation, the network side apparatus 20 transmits a correspondence relationship between aggregated serving cells and network side apparatuses to the user equipment 10; and correspondingly the use equipment 10 determines the network side apparatuses participating in aggregation according to the correspondence relationship between aggregated serving cells and network side apparatuses, that is, the user equipment determines network side apparatuses corresponding to serving cells of the user equipments as the network side apparatuses participating in aggregation.

Particularly the network side apparatus 20 may notify the user equipment 10 of the correspondence relationship between aggregated serving cells and network side apparatuses in RRC signaling.

The network side apparatus 20 may obtain the correspondence relationship between aggregated serving cells and network side apparatuses via interfaces with the other network side apparatuses, e.g., S1, X2, another known interface or a newly defined interface.

In an implementation, the user equipment 10 may report the power headroom information to the network side apparatuses participating in aggregation in a number of schemes, several of which will be listed below.

In a first scheme, PH is triggered to be reported per user equipment. The respective network side apparatuses participating in aggregation are notified of the PH information through interaction via interfaces between the network side apparatuses, or the respective network side apparatuses participating in aggregation are notified of the PH information by the user equipment reporting the PH information respectively to the respective network side apparatuses (without any interaction for the PH information between the network side apparatuses).

Particularly PH is triggered to be reported under the same principle as defined in the R10 and earlier releases.

According to the PHR-trigger mechanism, a PHR may be triggered per UE as long as one of the following conditions is satisfied by any serving cell aggregated for the UE:

The UE has an uplink resource for transmission of new data, a PHR prohibitive timer expires, and there is at least one activated serving cell with a Path Loss (PL) change exceeding a downlink path loss change (dl-Pathloss-Change);

A PHR periodic timer (periodicPHR-Timer) expires;

A PHR report function is configured or reconfigured by a higher layer except that disabling of a power headroom report is configured (see the 3GPP TS 36.321 and TS 36.331 protocols for details thereof);

Uplink activation of an SCell is configured; and

The UE has an uplink resource for transmission of new data, a PHR prohibitive timer expires, there is uplink transmission or PUCCH transmission in the TTI on any one activated serving cell configured with the UL, and a power fallback required since last PHR transmission is above the dl-PathlossChange.

A PHR is reported as follows:

The UE reports a PHR by carrying a Power Headroom Medium Access Control layer Control Element (MAC CE) or an extended PH MAC CE in an uplink MAC Protocol Data Unit (PDU). When the UE has an uplink resource for transmission of new data, if it is judged that a PHR is triggered, and it is determined from a result of processing the priorities of logic channels that a PH MAC CE and MAC sub-headers corresponding thereto can be accommodated in a transmitted uplink MAC PDU, then the UE calculates the current uplink power headroom, carries a PH MAC CE in a transmitted uplink MAC PDU, starts or restarts the periodicPHR-Timer and the PHR prohibitive timer (prohibitPHR-Timer) and cancels all the PHRs triggered.

Particularly, reference can be made to the 3GPP TS 36.321 protocol for the principle under which PH is triggered to be reported in the LTE R10 and earlier releases, so a repeated description thereof will be omitted here.

In an implementation, the user equipment 10 transmits the power headroom information for all the activated serving cells to at least one of the network side apparatuses 20 participating in aggregation, for example, it may transmit the power headroom information for all the activated serving cells to one of the network side apparatuses participating in aggregation or may transmit the power headroom information for all the activated serving cells to each of the network side apparatuses participating in aggregation.

The user equipment 10 may report the PH information over one of the following resources:

After a power headroom report is triggered, the power headroom information is reported via the first serving cell on which power headroom information can be carried; or After a serving cell controlled by a network side apparatus triggering a power headroom report has an available uplink resource, the power headroom information is reported over the available uplink resource (for example, if a PH report is triggered as a result of the condition being satisfied by a cell controlled by one of the evolved Node B's aggregated for the UE, then this eNB is an eNB triggering a PHR); or After a serving cell of a selected macro evolved Node B (the macro evolved Node B here is an evolved Node B providing wide area coverage, and a coverage area of the evolved Node B with wide area coverage includes a coverage area of an evolved Node B providing local coverage and the range of an area beyond local coverage) has an available uplink resource or a serving cell of a network side apparatus providing local coverage has an available uplink resource, the power headroom information is reported over the available uplink resource; or After a serving cell controlled by a network side apparatus selected to perform uplink scheduling has an available uplink resource, the power headroom information is reported over the available uplink resource; or If the condition to trigger a power headroom report is satisfied by at least one of serving cells of one of the network side apparatuses, and there has been no available uplink resource of the network side apparatus for a preset period of time after the condition to trigger a power headroom report is satisfied, then the user equipment reports the power headroom information over an available uplink resource of another one network side apparatus participating in aggregation; or If the condition to trigger a power headroom report is satisfied by at least one of serving cells controlled by at least one of the plurality of network side apparatuses (for example, m network side apparatuses are aggregated for the UE, and a PHR is triggered for at least one of serving cells controlled by n network side apparatuses (1<n≤m)), and a part of the plurality of network side apparatuses (the part of the network side apparatuses here is at least one network side apparatus with an available UL resource among the network side apparatuses aggregated for the UE) has an available uplink resource, then the user equipment 10 reports the power headroom information over the available uplink resource of the part of the network side apparatuses.

If the user equipment 10 transmits the power headroom information for all the activated serving cells to each of the network side apparatuses participating in aggregation, then the network side apparatuses receiving the power headroom information will not further forward the power headroom information.

When more than one of the network side apparatuses participating in aggregation has an uplink resource, the user equipment may report the power headroom information sequentially to the network side apparatuses participating in aggregation. For example, if firstly there is an uplink (UL) resource of a cell controlled by one of the network side apparatuses, then firstly the power headroom information may be reported to the network side apparatus; and if there are resources concurrently, then the user equipment may report the PH information respectively over the UL resources controlled by the different network side apparatuses.

If the user equipment 10 transmits the power headroom information for all the activated serving cells to one of the network side apparatuses participating in aggregation, then the network side apparatus receiving the power headroom information forwards all the received power headroom information to the other network side apparatuses or forwards the power headroom information related to the respective other network side apparatuses among the received power headroom information to the corresponding other network side apparatuses.

Particularly the network side apparatus receiving the power headroom information forwards all the received power headroom information to the other network side apparatuses participating in aggregation or participating in aggregation and performing uplink scheduling or the network side apparatus forwards the power headroom information related to the respective other network side apparatuses among the received power headroom information to the corresponding other network side apparatuses via interfaces between the network side apparatuses.

In a second scheme, a PHR mechanism per UE per eNB is adopted where the user equipment reports the PH information respectively to the network side apparatuses participating in aggregation without any interaction for the PH information between the network side apparatuses.

Particularly for one of the network side apparatuses participating in aggregation, the user equipment 10 transmits the power headroom information for all the activated serving cells controlled by the network side apparatus to the network side apparatus.

In an implementation, the user equipment 10 may further carry the power headroom information for the other activated serving cells while transmitting the power headroom information for all the activated serving cells controlled by the network side apparatus to the network side apparatus.

Particularly a PH information report per UE per eNB may be triggered as long as one of the following conditions is satisfied by any serving cell aggregated for the user equipment 10:

There is an uplink resource for transmission of new data, a PHR prohibitive timer for one of the network side apparatuses expires, and there is at least one activated serving cell, controlled by the network side apparatus, with a PL change exceeding a dl-PathlossChange in dB;

A power headroom information report function per UE per eNB is configured or reconfigured by a network side higher layer except that disabling of a PHR is configured;

When uplink activation of a serving cell is configured, the power headroom information of a network side apparatus controlling the serving cell or the power headroom information for all the activated serving cells is triggered to be reported; and The user equipment 10 has an uplink resource for transmission of new data, a PHR prohibitive timer for one of the network side apparatuses expires, and for any one activated serving cell, configured with the UL, controlled by the network side apparatus, if there is uplink transmission or PUCCH transmission on the serving cell, and a power fallback required since last transmission of power headroom information is above a threshold, then the power headroom information of the network side apparatus controlling the serving cell or the power headroom information for all the activated serving cells is triggered to be reported (for example, after a PHR prohibitive timer for an eNB expires, there are both an available resource for UL transmission and UL transmission on some occasion, and then the UE will trigger a PHR upon judging that there is a power fallback above the threshold).

The user equipment 10 may report the PH information over one of the following resources:

If the condition to trigger a power headroom report is satisfied by at least one of serving cells of one of the network side apparatuses, and there is an available uplink resource of the network side apparatus (the available uplink resource is an uplink resource for transmission of new data and capable of carrying the power headroom information (i.e., a PH MAC CE and sub-headers thereof)), then the user equipment reports the power headroom information for all the activated serving cells controlled by the network side apparatus to the network side apparatus over the available uplink resource; or If the condition to trigger a power headroom report is satisfied by at least one of serving cells controlled by at least one of the plurality of network side apparatuses (for example, m network side apparatuses are aggregated for the UE, and a PHR is triggered for at least one of serving cells controlled by n network side apparatuses ($1 < n \leq m$)), and each of the network side apparatuses triggering a power headroom report among the plurality of network side apparatuses has an available uplink resource, then the user equipment 10 reports the power headroom information for all the activated serving cells controlled by the network side apparatus respectively over the available uplink resource of the corresponding network side apparatus.

Particularly the network side apparatuses receiving the power headroom information will not further forward the power headroom information.

In a third scheme, a PHR mechanism per UE per eNB is adopted where the user equipment may report the PH information to the network side apparatuses participating in aggregation and the network side apparatuses pass the received PH information through interaction via interfaces therebetween. The reported PH information may be the PH information of the respective network side apparatuses or may be the PH information of the other network side apparatuses or may be the PH information corresponding to a part of the network side apparatuses or the PH information corresponding to all the network side apparatuses.

The user equipment 10 transmits the power headroom information for a part or all the activated serving cells to at least one of the network side apparatuses 20 participating in aggregation; or For one of the network side apparatuses participating in aggregation, the user equipment 10 transmits the power headroom information for all the activated serving cells controlled by the network side apparatus to the network side apparatus. In an implementation, the user equipment 10 may further carry the power headroom information for the other activated serving cells while transmitting the power headroom information for all the activated serving cells controlled by the network side apparatus to the network side apparatus.

Particularly a PH information report per UE per eNB may be triggered as long as one of the following conditions is satisfied by one of serving cells aggregated for the user equipment 10:

There is an uplink resource for transmission of new data, a PHR prohibitive timer for one of the network side apparatuses expires, and there is at least one activated serving cell, controlled by the network side apparatus, with a PL change exceeding a dl-PathlossChange;

A power headroom information report function per UE per eNB is configured or reconfigured by a network side higher layer except that disabling of a PHR is configured;

When uplink activation of a serving cell is configured, the power headroom information of a network side apparatus controlling the serving cell or the power headroom information for all the activated serving cells is triggered to be reported; and The user equipment 10 has an uplink resource for transmission of new data, a PHR prohibitive timer for one of the network side apparatuses expires, and for any one activated serving cell, configured with the UL, controlled by the network side apparatus, if there is uplink transmission or PUCCH transmission on the serving cell, and a power fallback required since last transmission of power headroom information is above a threshold, then the power headroom information of the network side apparatus controlling the serving cell or the power headroom information for all the activated serving cells is triggered to be reported (for example, after a PHR prohibitive timer for an eNB expires, there are both an available resource for UL transmission and UL transmission on some occasion, and then the UE will trigger a PHR upon judging that there is a power fallback above the threshold).

The user equipment 10 may report the PH information over one of the following resources:

After a power headroom report is triggered, the power headroom information is reported via the first serving cell on which power headroom information can be carried; or After a serving cell controlled by a network side apparatus triggering a power headroom report has an available uplink resource, the power headroom information is reported over the available uplink resource (for example, if a PH report is triggered as a result of the condition being satisfied by a cell controlled by one of the evolved Node B's aggregated for the UE, then this eNB is an eNB triggering a PH report); or After a serving cell of a selected macro evolved Node B (the macro evolved Node B here is an evolved Node B providing wide area coverage, and a coverage area of the evolved Node B with wide area coverage includes a coverage area of an evolved Node B providing local coverage and the range of an area beyond local coverage) has an available uplink resource or a serving cell of a network side apparatus providing local coverage has an available uplink resource, the power headroom information is reported over the available uplink resource; or After a serving cell controlled by a network side apparatus selected to perform uplink scheduling has an available uplink resource, the power headroom information is reported over the available uplink resource; or If the condition to trigger a power headroom report is satisfied by at least one of serving cells of one of the network side apparatuses, and there has been no available uplink resource of the network side apparatus for a preset period of time after the condition to trigger a power headroom report is satisfied, then the user equipment reports, the power headroom information for all the activated serving cells controlled by the network side apparatus, over an available uplink resource of another one network side apparatus participating in aggregation; or If the condition to trigger a power headroom report is satisfied by at least one of serving cells controlled by at least one of the plurality of network side apparatuses (for example, m network side apparatuses are aggregated for the UE, and a PHR is triggered on at least one of serving cells controlled by n network side apparatuses ($1<n\le m$)), and a part of the plurality of network side apparatuses (the part of the network side apparatuses here is at least one network side apparatus with an available UL resource among the network side apparatuses aggregated for the UE) has an available uplink resource, then the user equipment 10 reports, the power headroom information for all the activated serving cells of each of the network side apparatuses triggering a power headroom report among the plurality of network side apparatuses, over the available uplink resource of the part of the network side apparatuses.

If the user equipment 10 transmits the power headroom information for all the activated serving cells to each of the network side apparatuses participating in aggregation, then the network side apparatuses receiving the power headroom information will not further forward the power headroom information. If the user equipment 10 transmits to each of the network side apparatuses, triggering a PHR, aggregated for the user equipment the power headroom information for all the activated serving cells controlled by the network side apparatus, then the network side apparatus receiving the power headroom information will not further forward the power headroom information.

When more than one of the network side apparatuses participating in aggregation has an uplink resource, the user equipment may report the power headroom information sequentially to the network side apparatuses participating in aggregation. For example, if firstly there is an UL resource of a cell controlled by one of the network side apparatuses, then firstly the power headroom information may be reported to the network side apparatus; and if there are resources concurrently, then the user equipment may report the PH information respectively over the UL resources controlled by the different network side apparatuses.

If the user equipment 10 transmits the power headroom information for all the activated serving cells to one of the network side apparatuses participating in aggregation, then the network side apparatus receiving the power headroom information forwards all the received power headroom information to the other network side apparatuses or forwards the power headroom information related to the respective other network side apparatuses among the received power headroom information to the corresponding other network side apparatuses.

Particularly the network side apparatus receiving the power headroom information forwards all the received power headroom information to the other network side apparatuses participating in aggregation or participating in aggregation and performing uplink scheduling or the network side apparatus forwards the power headroom information related to the respective other network side apparatuses among the received power headroom information to the corresponding other network side apparatuses via interfaces between the network side apparatuses.

If the user equipment 10 transmits the power headroom information corresponding to one of the network side apparatuses participating in aggregation to another one network side apparatus participating in aggregation, then the network side apparatus receiving the power headroom information forwards the received power headroom information related to the respective other network side apparatuses to the corresponding other network side apparatuses.

Particularly the network side apparatus forwards the power headroom information related to the respective other network side apparatuses among the received power headroom information to the corresponding other network side apparatuses.

Particularly the network side device according to the embodiment of the invention may be an evolved Node B (e.g., a macro evolved Node B, a home evolved Node B, etc.) or may be a Relay Node (RN) apparatus or may be another network side apparatus.

Figure 2A:
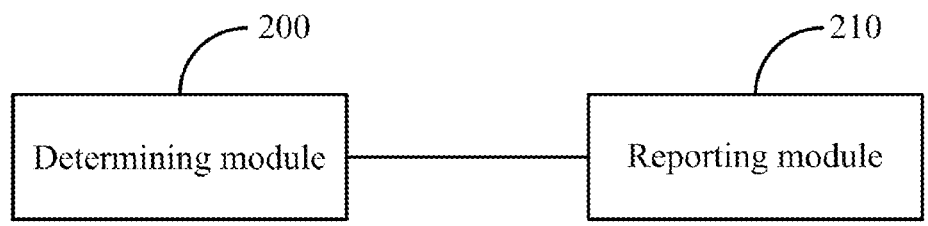
FIG. 2A is a schematic structural diagram of a user equipment in a system for reporting power headroom according to an embodiment of the invention.

As illustrated in FIG. 2A, a user equipment in a system for reporting power headroom according to an embodiment of the invention includes a determining module 200 and a reporting module 210, where the determining module 200 may particularly be a processor, etc., of the user equipment, and the reporting module 210 may particularly be a signal transmitter, including a transmit antenna, etc., of the user equipment.

The determining module 200 is configured to determine power headroom information after resources of a plurality of network side apparatuses are aggregated for the user equipment; and The reporting module 210 is configured to transmit the power headroom information to at least one of the network side apparatuses participating in aggregation.

The reporting module 210 may determine the network side apparatuses participating in aggregation according to a correspondence relationship between aggregated serving cells and network side apparatuses before transmitting the power headroom information to at least one of the network side apparatuses participating in aggregation.

The reporting module 210 may transmit the power headroom information for all the activated serving cells controlled by all the evolved Node B's participating in aggregation to one of the network side apparatuses participating in aggregation or may transmit the power headroom information for all the activated serving cells controlled by all the evolved Node B's participating in aggregation to each of the network side apparatuses participating in aggregation.

After a power headroom report is triggered, the reporting module 210 may report the power headroom information via the first serving cell on which power headroom information can be carried; or after a serving cell controlled by a network side apparatus triggering a power headroom report has an available uplink resource, the reporting module may report the power headroom information over the available uplink resource; or after a serving cell of a selected macro evolved Node B has an available uplink resource or a serving cell of a network side apparatus providing local coverage has an available uplink resource, the reporting module may report the power headroom information over the available uplink resource; or after a serving cell controlled by a network side apparatus selected to perform uplink scheduling has an available uplink resource, the reporting module may report the power headroom information over the available uplink resource; or if a condition to trigger a power headroom report is satisfied by at least one of serving cells of one of the network side apparatuses, and there has been no available uplink resource of the network side apparatus for a preset period of time after the condition to trigger a power headroom report is satisfied, then the reporting module may report the power headroom information over an available uplink resource of another one network side apparatus participating in aggregation; or if the condition to trigger a power headroom report is satisfied by at least one of serving cells controlled by at least one of the plurality of network side apparatuses, and a part of the plurality of network side apparatuses has an available uplink resource, then the reporting module may report the power headroom information over the available uplink resource of the part of the network side apparatuses.

When more than one of the network side apparatuses participating in aggregation has an uplink resource, the reporting module 210 may report the power headroom information sequentially to the network side apparatuses participating in aggregation.

For one of the network side apparatuses participating in aggregation, the reporting module 210 may transmit the power headroom information for all the activated serving cells controlled by the network side apparatus to the network side apparatus.

If the condition to trigger a power headroom report is satisfied by at least one of serving cells of one of the network side apparatuses, and there is an available uplink resource of the network side apparatus, then the reporting module 210 may report the power headroom information for all the activated serving cells controlled by the network side apparatus to the network side apparatus over the available uplink resource, and if there has been no available uplink resource of the network side apparatus for a preset period of time after the condition to trigger a power headroom report is satisfied, then the reporting module may report, the power headroom information for all the activated serving cells controlled by the network side apparatus, over an available uplink resource of another one network side apparatus participating in aggregation; or if the condition to trigger a power headroom report is satisfied by at least one of serving cells controlled by at least one of the plurality of network side apparatuses, and a part of the plurality of network side apparatuses has an available uplink resource, then the reporting module 210 may report, the power headroom information for all the activated serving cells of each of the network side apparatuses triggering a power headroom report among the plurality of network side apparatuses, over the available uplink resource of the part of the network side apparatuses; or if the condition to trigger a power headroom report is satisfied by at least one of serving cells controlled by at least one of the plurality of network side apparatuses, and each of the network side apparatuses triggering a power headroom report among the plurality of network side apparatuses has an available uplink resource, then the reporting module 210 may report the power headroom information for all the activated serving cells controlled by the network side apparatus respectively over the available uplink resource of the corresponding network side apparatus.

The reporting module 210 may transmit the power headroom information to at least one of the network side apparatuses participating in aggregation upon determining that a part or all the following conditions to trigger a power headroom report is or are satisfied:

There is an uplink resource for transmission of new data, a PHR prohibitive timer for one of the network side apparatuses expires, and there is at least one activated serving cell, controlled by the network side apparatus, with a PL change exceeding a dl-PathlossChange in dB;

A power headroom information report function per UE per eNB is configured or reconfigured by a network side higher layer except that disabling of a PHR is configured;

When uplink activation of a serving cell is configured, the power headroom information of a network side apparatus controlling the serving cell or the power headroom information for all the activated serving cells is triggered to be reported; and There is an uplink resource for transmission of new data, a PHR prohibitive timer for one of the network side apparatuses expires, and for any one activated serving cell, configured with the UL, controlled by the network side apparatus, if there is uplink transmission or PUCCH transmission on the serving cell, and a power fallback required since last transmission of power headroom information is above a threshold, then the power headroom information of the network side apparatus controlling the serving cell or the power headroom information for all the activated serving cells is triggered to be reported.

Figure 2B:
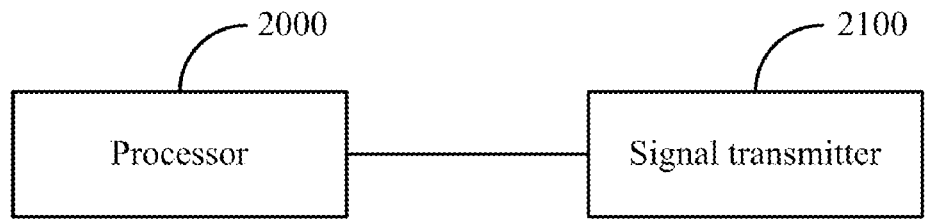
FIG. 2B is a schematic structural diagram of another user equipment in a system for reporting power headroom according to an embodiment of the invention.

When the determining module 200 is a processor and the reporting module 210 is a signal transmitter, as illustrated in FIG. 2B, a user equipment in a system for reporting power headroom according to an embodiment of the invention includes a processor 2000 and a signal transmitter 2100, where:

The processor 2000 is configured to determine power headroom information after resources of a plurality of network side apparatuses are aggregated for the user equipment; and The signal transmitter 2100 is configured to transmit the power headroom information to at least one of the network side apparatuses participating in aggregation.

The signal transmitter 2100 may determine the network side apparatuses participating in aggregation according to a correspondence relationship between aggregated serving cells and network side apparatuses before transmitting the power headroom information to at least one of the network side apparatuses participating in aggregation.

The signal transmitter 2100 may transmit the power headroom information for all the activated serving cells controlled by all the evolved Node B's participating in aggregation to one of the network side apparatuses participating in aggregation or may transmit the power headroom information for all the activated serving cells controlled by all the evolved Node B's participating in aggregation to each of the network side apparatuses participating in aggregation.

After a power headroom report is triggered, the signal transmitter 2100 may report the power headroom information via the first serving cell on which power headroom information can be carried; or after a serving cell controlled by a network side apparatus triggering a power headroom report has an available uplink resource, the signal transmitter may report the power headroom information over the available uplink resource; or after a serving cell of a selected macro evolved Node B has an available uplink resource or a serving cell of a network side apparatus providing local coverage has an available uplink resource, the signal transmitter may report the power headroom information over the available uplink resource; or after a serving cell controlled by a network side apparatus selected to perform uplink scheduling has an available uplink resource, the signal transmitter may report the power headroom information over the available uplink resource; or if a condition to trigger a power headroom report is satisfied by at least one of serving cells of one of the network side apparatuses, and there has been no available uplink resource of the network side apparatus for a preset period of time after the condition to trigger a power headroom report is satisfied, then the signal transmitter may report the power headroom information over an available uplink resource of another one network side apparatus participating in aggregation; or if the condition to trigger a power headroom report is satisfied by at least one of serving cells controlled by at least one of the plurality of network side apparatuses, and a part of the plurality of network side apparatuses has an available uplink resource, then the signal transmitter may report the power headroom information over the available uplink resource of the part of the network side apparatuses.

When more than one of the network side apparatuses participating in aggregation has an uplink resource, the signal transmitter 2100 may report the power headroom information sequentially to the network side apparatuses participating in aggregation.

For one of the network side apparatuses participating in aggregation, the signal transmitter 2100 may transmit the power headroom information for all the activated serving cells controlled by the network side apparatus to the network side apparatus.

If the condition to trigger a power headroom report is satisfied by at least one of serving cells of one of the network side apparatuses, and there is an available uplink resource of the network side apparatus, then the signal transmitter 2100 may report the power headroom information for all the activated serving cells controlled by the network side apparatus to the network side apparatus over the available uplink resource, and if there has been no available uplink resource of the network side apparatus for a preset period of time after the condition to trigger a power headroom report is satisfied, then the signal transmitter may report, the power headroom information for all the activated serving cells controlled by the network side apparatus, over an available uplink resource of another one network side apparatus participating in aggregation; or if the condition to trigger a power headroom report is satisfied by at least one of serving cells controlled by at least one of the plurality of network side apparatuses, and a part of the plurality of network side apparatuses has an available uplink resource, then the signal transmitter 2100 may report, the power headroom information for all the activated serving cells of each of the network side apparatuses triggering a power headroom report among the plurality of network side apparatuses, over the available uplink resource of the part of the network side apparatuses; or if the condition to trigger a power headroom report is satisfied by at least one of serving cells controlled by at least one of the plurality of network side apparatuses, and each of the network side apparatuses triggering a power headroom report among the plurality of network side apparatuses has an available uplink resource, then the signal transmitter 2100 may report the power headroom information for all the activated serving cells controlled by the network side apparatus respectively over the available uplink resource of the corresponding network side apparatus.

The signal transmitter 2100 may transmit the power headroom information to at least one of the network side apparatuses participating in aggregation upon determining that a part or all the following conditions to trigger a power headroom report is or are satisfied:

There is an uplink resource for transmission of new data, a PHR prohibitive timer for one of the network side apparatuses expires, and there is at least one activated serving cell, controlled by the network side apparatus, with a PL change exceeding a dl-PathlossChange in dB;

A power headroom information report function per UE per eNB is configured or reconfigured by a network side higher layer except that disabling of a PHR is configured;

When uplink activation of a serving cell is configured, the power headroom information of a network side apparatus controlling the serving cell or the power headroom information for all the activated serving cells is triggered to be reported; and There is an uplink resource for transmission of new data, a PHR prohibitive timer for one of the network side apparatuses expires, and for any one activated serving cell, configured with the UL, controlled by the network side apparatus, if there is uplink transmission or PUCCH transmission on the serving cell, and a power fallback required since last transmission of power headroom information is above a threshold, then the power headroom information of the network side apparatus controlling the serving cell or the power headroom information for all the activated serving cells is triggered to be reported.

Figure 3A:
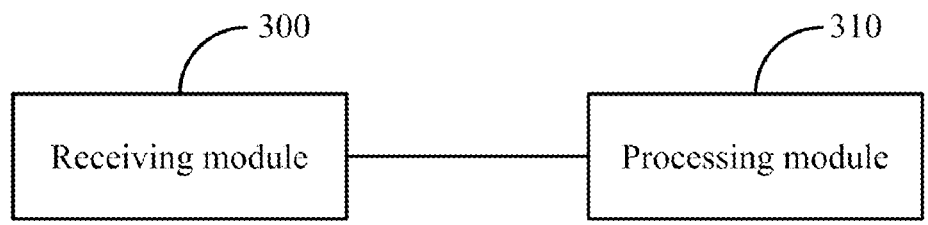
FIG. 3A is a schematic structural diagram of a network side apparatus in a system for reporting power headroom according to an embodiment of the invention.

As illustrated in FIG. 3A, a network side apparatus in a system for reporting power headroom according to an embodiment of the invention includes a receiving module 300 and a processing module 310, where the receiving module 300 may particularly be a signal receiver, including a receive antenna, etc., of the network side apparatus, and the processing module 310 may particularly be a processor, etc., of the network side apparatus.

The receiving module 300 is configured to receive power headroom information reported by a user equipment for which resources of a plurality of network side apparatuses are aggregated; and The processing module 310 is configured to perform scheduling according to the power headroom information.

The processing module 310 may transmit a correspondence relationship between aggregated serving cells and network side apparatuses to the user equipment before receiving the power headroom information reported by the user equipment for which the resources of the plurality of network side apparatuses are aggregated.

The processing module 310 may obtain the correspondence relationship between aggregated serving cells and network side apparatuses from another network side apparatus.

The processing module 310 may forward all the received power headroom information to the other network side apparatuses or forwards the power headroom information related to the respective other network side apparatuses among the received power headroom information to the corresponding other network side apparatuses.

Figure 3B:
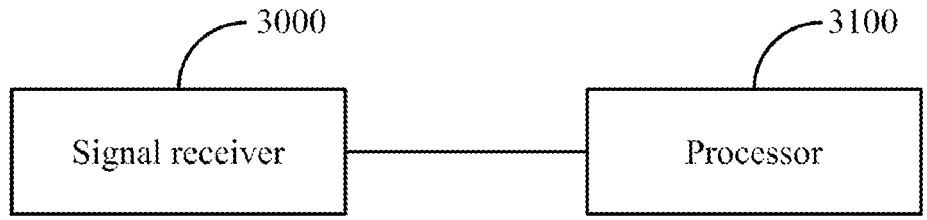
FIG. 3B is a schematic structural diagram of another network side apparatus in a system for reporting power headroom according to an embodiment of the invention.

When the receiving module 300 is a signal receiver and the processing module 310 is a processor, as illustrated in FIG. 3B, a network side apparatus in a system for reporting power headroom according to an embodiment of the invention includes a signal receiver 3000 and a processor 3100, where:

The signal receiver 3000 is configured to receive power headroom information reported by a user equipment for which resources of a plurality of network side apparatuses are aggregated; and The processor 3100 is configured to perform scheduling according to the power headroom information.

The processor 3100 may transmit a correspondence relationship between aggregated serving cells and network side apparatuses to the user equipment before receiving the power headroom information reported by the user equipment for which the resources of the plurality of network side apparatuses are aggregated.

The processor 3100 may obtain the correspondence relationship between aggregated serving cells and network side apparatuses from another network side apparatus.

The processor 3100 may forward all the received power headroom information to the other network side apparatuses or may forward the power headroom information related to the respective other network side apparatuses among the received power headroom information to the corresponding other network side apparatuses.

Based upon the same inventive idea, embodiments of the invention further provide a method of reporting power headroom by a user equipment and a method of processing a power headroom by a network side device, and since these methods address the problem under a principle similar to that of the system for reporting power headroom according to the embodiment of the invention, reference can be made to an implementation of the system for implementations of these methods, so a repeated description thereof will be omitted here.

Figure 4:
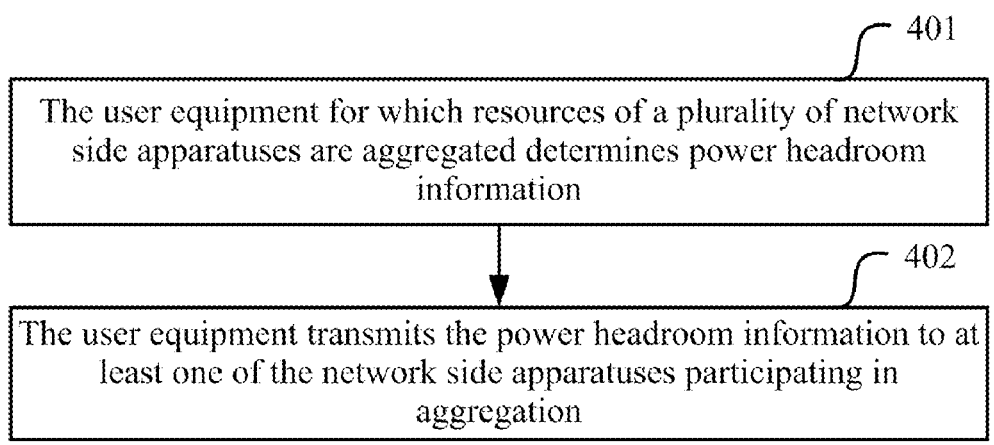
FIG. 4 is a schematic flow chart of a method reporting power headroom by a user equipment according to an embodiment of the invention.

As illustrated in FIG. 4, a method of reporting power headroom by a user equipment according to an embodiment of the invention includes the following steps:

In the step 401, the user equipment for which resources of a plurality of network side apparatuses are aggregated determines power headroom information; and In the step 402, the user equipment transmits the power headroom information to at least one of the network side apparatuses participating in aggregation.

In an implementation, the user equipment determines the network side apparatuses participating in aggregation according to the correspondence relationship between aggregated serving cells and network side apparatuses.

The user equipment may report the power headroom information to the network side apparatuses participating in aggregation in a number of schemes, several of which will be listed below.

In a first scheme, PH is triggered to be reported per user equipment. The respective network side apparatuses participating in aggregation are notified of the PH information through interaction via interfaces between the network side apparatuses, or the respective network side apparatuses participating in aggregation are notified of the PH information by the user equipment reporting the PH information respectively to the respective network side apparatuses (without any interaction for the PH information between the network side apparatuses).

Particularly PH is triggered to be reported under the same principle as the R10 and earlier releases.

Particularly, reference can be made to the 3GPP TS 36.321 protocol for the principle under which PH is triggered to be reported in the LTE R10 and earlier releases, so a repeated description thereof will be omitted here.

In an implementation, the user equipment transmits the power headroom information for all the activated serving cells controlled by all the eNBs participating in aggregation to at least one of the network side apparatuses participating in aggregation, for example, it may transmit the power headroom information for all the activated serving cells controlled by all the eNBs participating in aggregation to one of the network side apparatuses participating in aggregation or may transmit the power headroom information for all the activated serving cells controlled by all the eNBs participating in aggregation to each of the network side apparatuses participating in aggregation.

The user equipment may report the PH information over one of the following resources:

After a power headroom report is triggered, the power headroom information is reported via the first serving cell on which power headroom information can be carried; or After a serving cell controlled by a network side apparatus triggering a power headroom report has an available uplink resource, the power headroom information is reported over the available uplink resource; or After a serving cell of a selected macro evolved Node B has an available uplink resource or a serving cell of a network side apparatus providing local coverage has an available uplink resource, the power headroom information is reported over the available uplink resource; or After a serving cell controlled by a network side apparatus selected to perform uplink scheduling has an available uplink resource, the power headroom information is reported over the available uplink resource; or If the condition to trigger a power headroom report is satisfied by at least one of serving cells of one of the network side apparatuses, and there has been no available uplink resource of the network side apparatus for a preset period of time after the condition to trigger a power headroom report is satisfied, then the user equipment reports the power headroom information over an available uplink resource of another one network side apparatus participating in aggregation; or If the condition to trigger a power headroom report is satisfied by at least one of serving cells controlled by at least one of the plurality of network side apparatuses, and a part of the plurality of network side apparatuses has an available uplink resource, then the user equipment reports the power headroom information over the available uplink resource of the part of the network side apparatuses.

When more than one of the network side apparatuses participating in aggregation has an uplink resource, the user equipment may report the power headroom information sequentially to the network side apparatuses participating in aggregation.

In a second scheme, a PHR mechanism per UE per eNB is adopted where the user equipment reports the PH information respectively to the network side apparatuses participating in aggregation without any interaction for the PH information between the network side apparatuses.

Particularly for one of the network side apparatuses participating in aggregation, the user equipment transmits the power headroom information for all the activated serving cells controlled by the network side apparatus to the network side apparatus.

In an implementation, the user equipment may further carry the power headroom information for the other activated serving cells while transmitting the power headroom information for all the activated serving cells controlled by the network side apparatus to the network side apparatus.

Particularly PH information report per UE per eNB may be triggered as long as one of the following conditions is satisfied by any serving cell aggregated for the user equipment:

There is an uplink resource for transmission of new data, a PHR prohibitive timer for one of the network side apparatuses expires, and there is at least one activated serving cell, controlled by the network side apparatus, with a PL change exceeding a dl-PathlossChange in dB;

A power headroom information report function per UE per eNB is configured or reconfigured by a network side higher layer except that disabling of a PHR is configured;

When uplink activation of a serving cell is configured, the power headroom information of a network side apparatus controlling the serving cell or the power headroom information for all the activated serving cells is triggered to be reported; and The user equipment has an uplink resource for transmission of new data, a PHR prohibitive timer for one of the network side apparatuses expires, and for any one activated serving cell, configured with the UL, controlled by the network side apparatus, if there is uplink transmission or PUCCH transmission over the serving cell, and a power fallback required since last transmission of power headroom information is above a threshold, then the power headroom information of the network side apparatus controlling the serving cell or the power headroom information for all the activated serving cells is triggered to be reported.

The user equipment may report the PH information over one of the following resources:

If the condition to trigger a power headroom report is satisfied by at least one of serving cells of one of the network side apparatuses, and there is an available uplink resource of the network side apparatus, then the user equipment reports the power headroom information for all the activated serving cells controlled by the network side apparatus to the network side apparatus over the available uplink resource; or If the condition to trigger a power headroom report is satisfied by at least one of serving cells controlled by at least one of the plurality of network side apparatuses, and each of the network side apparatuses triggering a power headroom report among the plurality of network side apparatuses has an available uplink resource, then the user equipment reports the power headroom information for all the activated serving cells controlled by the network side apparatus respectively over the available uplink resource of the corresponding network side apparatus.

In a third scheme, a PHR mechanism per UE per eNB is adopted where the user equipment may report the PH information to the network side apparatuses participating in aggregation and the network side apparatuses pass the received PH information through interaction via interfaces therebetween. The reported PH information may be the PH information of the respective network side apparatuses or may be the PH information of the other network side apparatuses or may be the PH information corresponding to a part of the network side apparatuses or the PH information corresponding to all the network side apparatuses.

The user equipment transmits the power headroom information for a part or all the activated serving cells to at least one of the network side apparatuses participating in aggregation; or For one of the network side apparatuses participating in aggregation, the user equipment transmits the power headroom information for all the activated serving cells controlled by the network side apparatus to the network side apparatus. In an implementation, the user equipment may further carry the power headroom information for the other activated serving cells while transmitting the power headroom information for all the activated serving cells controlled by the network side apparatus to the network side apparatus.

Particularly PH information report per UE per eNB may be triggered as long as one of the following conditions is satisfied by any serving cell aggregated for the user equipment:

There is an uplink resource for transmission of new data, a PHR prohibitive timer for one of the network side apparatuses expires, and there is at least one activated serving cell, controlled by the network side apparatus, with a PL change exceeding a dl-PathlossChange in dB;

A power headroom information report function per UE per eNB is configured or reconfigured by a network side higher layer except that disabling of a PHR is configured;

When uplink activation of a serving cell is configured, the power headroom information of a network side apparatus controlling the serving cell or the power headroom information for all the activated serving cells is triggered to be reported; and The user equipment has an uplink resource for transmission of new data, a PHR prohibitive timer for one of the network side apparatuses expires, and for any one activated serving cell, configured with the UL, controlled by the network side apparatus, if there is uplink transmission or PUCCH transmission over the serving cell, and a power fallback required since last transmission of power headroom information is above a threshold, then the power headroom information of the network side apparatus controlling the serving cell or the power headroom information for all the activated serving cells is triggered to be reported.

The user equipment may report the PH information over one of the following resources:

After a power headroom report is triggered, the power headroom information is reported via the first serving cell on which power headroom information can be carried; or After a serving cell controlled by a network side apparatus triggering a power headroom report has an available uplink resource, the power headroom information is reported over the available uplink resource; or After a serving cell of a selected macro evolved Node B has an available uplink resource or a serving cell of a network side apparatus providing local coverage has an available uplink resource, the power headroom information is reported over the available uplink resource; or After a serving cell controlled by a network side apparatus selected to perform uplink scheduling has an available uplink resource, the power headroom information is reported over the available uplink resource; or If the condition to trigger a power headroom report is satisfied by at least one of serving cells of one of the network side apparatuses, and there has been no available uplink resource of the network side apparatus for a preset period of time after the condition to trigger a power headroom report is satisfied, then the user equipment reports, the power headroom information for all the activated serving cells controlled by the network side apparatus, over an available uplink resource of another network side apparatus participating in aggregation; or If the condition to trigger a power headroom report is satisfied by at least one of serving cells controlled by at least one of the plurality of network side apparatuses, and a part of the plurality of network side apparatuses has an available uplink resource, then the user equipment reports, the power headroom information for all the activated serving cells of each of the network side apparatuses triggering a power headroom report among the plurality of network side apparatuses, over the available uplink resource of the part of the network side apparatuses.

If the user equipment transmits the power headroom information for all the activated serving cells to each of the network side apparatuses participating in aggregation, then the network side apparatuses receiving the power headroom information will not further forward the power headroom information. If the user equipment transmits to each of the network side apparatuses, triggering a PHR, aggregated for the user equipment the power headroom information for all the activated serving cells controlled by the network side apparatus, then the network side apparatus receiving the power headroom information will not further forward the power headroom information.

When more than one of the network side apparatuses participating in aggregation has an uplink resource, the user equipment may report the power headroom information sequentially to the network side apparatuses participating in aggregation.

Figure 5:
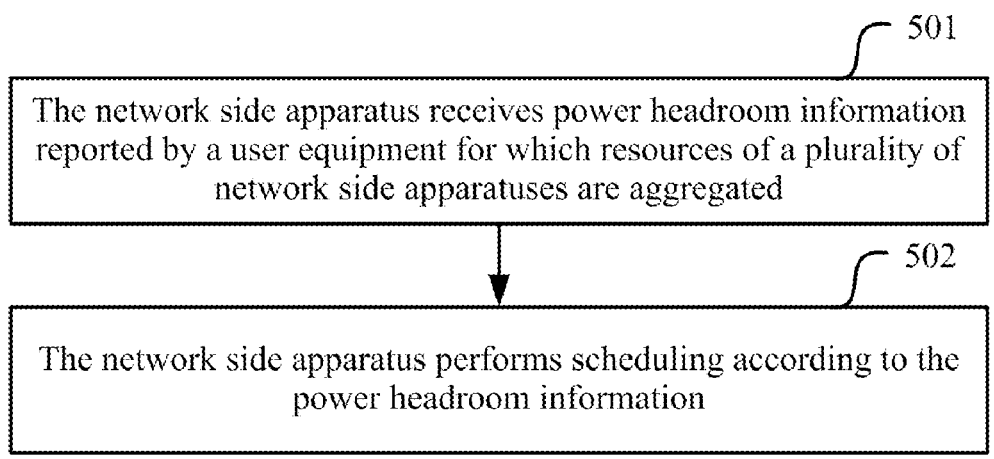
FIG. 5 is a schematic flow chart of a method reporting power headroom by a network side apparatus according to an embodiment of the invention.

As illustrated in FIG. 5, a method of reporting power headroom by a network side apparatus according to an embodiment of the invention includes the following steps:

In the step 501, the network side apparatus receives power headroom information reported by a user equipment for which resources of a plurality of network side apparatuses are aggregated; and In the step 502, the network side apparatus performs scheduling according to the power headroom information.

Before the step 501, the method may further include:

The network side apparatus transmits a correspondence relationship between aggregated serving cells and network side apparatuses to the user equipment.

The network side apparatus may obtain the correspondence relationship between aggregated serving cells and network side apparatuses from another network side apparatus.

After the step 502, the method may further include:

The network side apparatus forwards all the received power headroom information to the other network side apparatuses; or The network side apparatus forwards the power headroom information related to the respective other network side apparatuses among the received power headroom information to the corresponding other network side apparatuses.

Particularly FIG. 4 and FIG. 5 may be combined into a flow of a method of reporting power headroom, that is, firstly the step 401 and the step 402 and then the step 501 and the step 502 are performed.

The first scheme will be described below in details in two examples:

In a first example, the existing mechanism to trigger a PHR (where a PHR is triggered per UE) is reused where PH information for all the activated serving cells controlled by all the eNBs participating in aggregation is reported to one of the evolved Node B's and the PH information is exchanged between each two of the evolved Node B's via interfaces therebetween.

In the step 1, the UE is notified of a relationship between eNBs and serving cells serving the UE:

An evolved Node B initially accessed by the UE determines, from the location, mobility and other information of the UE, eNBs which can be aggregated for the UE and cells, which can serve the UE, controlled by the eNBs participating in aggregation, and notifies the UE of a mapping relationship between the eNBs and the serving cells serving the UE in RRC signaling, which may include index information of the eNBs which can be aggregated for the UE, index information of the serving cells, etc.

In the step 2, PHR parameters per UE are configured:

The evolved Node B configures the UE with PHR related RRC layer parameters including periodicPHR-Timers, prohibitPHR-Timers and dl-PathlossChanges. Evolved Node B's corresponding to the parameters include the evolved Node B's participating in aggregation or an evolved Node B responsible for mobility management, an evolved Node B providing macro coverage, an evolved Node B responsible for receiving a PHR, etc.

In the step 3, a PHR is triggered:

A trigger type and a trigger pattern of a PHR may conform to the mechanism to trigger a PHR in the R10 and earlier releases, and reference can be made to the Background of the Invention for details thereof.

In the step 4: A PHR is reported:

A principle to report a PHR may conform to the principle to report a PHR in the R10 and earlier releases, and reference may be made to the Background of the Invention for details thereof. PH information of the different eNBs is packaged in the same PH MAC CE to reflect PH information for all the activated serving cells aggregated for the UE and is reported to the eNB.

Various corresponding formats of the PH MAC CE may be designed according to the number of aggregated cells, the particular notification form of the relationship between the eNBs and the serving cells in the step 1 and other information, for example, by extending an existing extended PH MAC CE format or introducing a new LCID. Particularly if an existing extended PH MAC CE format is extended, then the UE may further report Type 2 power headrooms (Type 2 PHs), maximum transmit power of carriers and other information corresponding to serving cells, supporting PUCCH transmission, controlled by the other eNBs where the cells other than a PCell are located in addition to information included in the existing extended PH MAC CE; and the UE reports only the PHs of the activated cells controlled by the eNBs corresponding to the cells for which a PHR is triggered, and if some cell is configured with PUCCH transmission, the type 2 PH and other information thereof may be reported even if the cell is other than the PCell. If a new LCID is introduced, then a new LCID distinguished from a previous PH report for the same eNB needs to be introduced.

A PHR report resource may be selected in the following several schemes:

After a PHR is triggered, the PHs are reported in the first sub-frame in which the PH MAC CE and sub-headers thereof can be carried;

The PHs are reported when a serving cell controlled by an evolved Node B triggering a PHR has an available uplink resource;

The PHs are reported when a serving cell controlled by a selected macro evolved Node B or an evolved Node B providing local coverage has an available uplink resource; and The PHs are reported when a serving cell controlled by an evolved Node B selected to perform uplink scheduling has an available uplink resource.

In the step 5, the PH information is exchanged.

If the UE does not report the PH information to all the evolved Node B's participating in aggregation, then the PH information reported by the UE needs to be passed through interaction via interfaces between the evolved Node B's. The PH information may be forwarded in the following several schemes:

The eNB forwards all the received PH information to the other evolved Node B's; and The eNB forwards only the PH information related to a destination evolved Node B among the received PH information to the evolved Node B.

In a second example, the existing mechanism to trigger a PHR (where a PHR is triggered per UE) is reused where PH information for all the activated serving cells controlled by all the eNBs participating in aggregation is reported, and when the serving cells controlled by the different eNBs have available uplink resources, a PHR is reported over the serving cells of the different evolved Node B's.

In the step 1, the UE is notified of a relationship between eNBs and serving cells serving the UE:

In the step 2, PHR parameters per UE are configured:

In the step 3, a PHR is triggered:

Particularly the steps 1 to 3 are performed as in the first example.

In the step 4: A PHR is reported:

A principle to report a PHR may conform to the principle to report a PHR in the R10 and earlier releases, and reference can be made to the Background of the Invention for details thereof. PH information of the different eNBs is packaged in the same PH MAC CE to reflect PH information for all the activated serving cells aggregated for the UE. The information may be reported sequentially to the eNBs aggregated for the UE when there are uplink resources of the eNBs participating in aggregation to thereby avoid the PH information from being exchanged between the different evolved Node B's.

A solution in which the first scheme and the third scheme are combined will be described below in details in an example:

A new mechanism to trigger a PHR (where a PHR is triggered per UE per eNB) is introduced, but an evolved Node B reporting a PHR per UE is maintained, and when PH report per UE per eNB is triggered, the UE reports PH information for all the activated serving cells controlled by all the eNBs participating in aggregation. When a PHR is performed, the closest cell with an uplink resource available may be selected to perform the PHR, and if an evolved Node B obtaining the PH information detects any PH information of a cell which is not controlled by the evolved Node B, then the PH information needs to be passed to a destination evolved Node B through interaction via an interface between the evolved Node B's.

In the step 1, the UE is notified of a relationship between eNBs and serving cells serving the UE:

An evolved Node B initially accessed by the UE determines, from the location, mobility and other information of the UE, eNBs which can be aggregated for the UE and cells, which can serve the UE, controlled by the eNBs participating in aggregation, and notifies the UE of a mapping relationship between the eNBs and the serving cells serving the UE in RRC signaling, which may include index information of the eNBs which can be aggregated for the UE, index information of the serving cells, etc.

In the step 2, the eNB notifies of configured PHR parameters per UE per eNB:

The evolved Node B configures the UE with PHR related RRC layer parameters including periodicPHR-Timers, prohibitPHR-Timers and dl-PathlossChanges. Evolved Node B's corresponding to the parameters include the evolved Node B's participating in aggregation or an evolved Node B responsible for mobility management, an evolved Node B providing macro coverage, an evolved Node B responsible for receiving a PHR, etc.

Particularly the prohibitPHR-Timers may be modified to the type of configuration per UE per eNB, and the periodicPHR-Timers and/or the dl-PathlossChanges may also be the type of configuration per UE per eNB; and the particular scheme per UE per eNB may be implemented by modifying the use of the existing parameters or introducing new configured parameters.

In the step 3, a PHR is triggered:

A mechanism to trigger a PHR per UE per eNB is introduced. In the so-called mechanism to trigger a PHR per UE per eNB, a PHR per UE per eNB may be triggered as long as one of the following conditions is satisfied by any serving cell aggregated for the R12 UE:

The UE has an uplink resource for transmission of new data, a PHR prohibitive timer for some eNB expires, and there is at least one activated serving cell, controlled by the eNB, with a PL change exceeding a dl-PathlossChange in dB;

A function to perform a PHR per UE per eNB is configured or reconfigured by a higher layer except that disabling of a PHR is configured (see the 3GPP TS 36.321 and TS 36.331 protocols for details thereof);

When uplink activation of a serving cell is configured, PH information for all the activated cells controlled by an evolved Node B controlling the serving cell and by the other evolved Node B's aggregated for the UE is triggered to be reported; and The UE has an uplink resource for transmission of new data, a PHR prohibitive timer for some eNB expires, and for any one activated serving cell, configured with the UL, controlled by the eNB, if there is uplink transmission or PUCCH transmission in the TTI (that is, when the UE has an uplink resource for transmission of new data and a PHR prohibitive timer for some eNB expires), and a power fallback required since last PHR transmission (known from the Power management-Maximum Power Reduction of a cell c (P-MPRc)) is above the dl-PathlossChange, then the PH information for all the activated serving cells is triggered to be reported.

In the step 4: A PHR is reported:

A mechanism to report a PHR per UE is adopted. When a PHR is performed, the closest cell with an uplink resource available may be selected to perform the PHR, and if an evolved Node B obtaining the PH information detects any PH information of a cell which is not controlled by the evolved Node B, then the PH information needs to be passed to a destination evolved Node B through interaction via an interface between the evolved Node B's.

A principle to report a PHR may conform to the principle to report a PHR in the R10 and earlier releases. After reporting a PH Media Access Control layer Control Element (MAC CE), the UE starts or restarts the periodicPHR-Timer per UE and the prohibitPHR-Timer per UE per eNB and cancels all the PHRs triggered.

In the step 5, the PH information is exchanged (through interaction for the PH information if necessary).

If the evolved Node B obtaining the PH information detects any PH information of a cell which is not controlled by the evolved Node B, then the PH information reported by the UE needs to be exchanged through interaction via an interface between the evolved Node B's. The PH information may be forwarded in the following several schemes:

The eNB forwards all the received PH information to the other evolved Node B's; and The eNB forwards only the PH information related to a destination evolved Node B among the received PH information to the evolved Node B.

The second scheme will be described below in details in an example:

A new mechanism to trigger a PHR (where a PHR is triggered per UE per eNB) is introduced where the UE performs a PHR respectively to evolved Node B's participating in aggregation without any interaction for PHR information between the evolved Node B's.

In the step 1, the UE is notified of a relationship between eNBs and serving cells serving the UE:

An evolved Node B initially accessed by the UE determines, from the location, mobility and other information of the UE, eNBs which can be aggregated for the UE and cells, which can serve the UE, controlled by the eNBs participating in aggregation, and notifies the UE of a mapping relationship between the eNBs and the serving cells serving the UE in RRC signaling, which may include index information of the eNBs which can be aggregated for the UE, index information of the serving cells, etc.

In the step 2, the eNB notifies of configured PHR parameters per UE per eNB:

The evolved Node B configures the UE with PHR related RRC layer parameters including periodicPHR-Timers, prohibitPHR-Timers and dl-PathlossChanges. Evolved Node B's corresponding to the parameters include the evolved Node B's participating in aggregation or an evolved Node B responsible for mobility management, an evolved Node B providing macro coverage, an evolved Node B responsible for receiving a PHR, etc.

Particularly the prohibitPHR-Timers may be modified to the type of configuration per UE per eNB, and the periodicPHR-Timers and/or the dl-PathlossChanges may also be the type of configuration per UE per eNB; and the particular scheme per UE per eNB may be implemented by modifying the use of the existing parameters or introducing new configured parameters.

In the step 3, a PHR is triggered:

A mechanism to trigger a PHR per UE per eNB is introduced. In the so-called mechanism to trigger a PHR per UE per eNB, a PHR per UE per eNB may be triggered as long as one of the following conditions is satisfied by any serving cell aggregated for the R12 UE:

The UE has an uplink resource for transmission of new data, a PHR prohibitive timer for some eNB expires, and there is at least one activated serving cell, controlled by the eNB, with a PL change exceeding a dl-PathlossChange in dB;

A function to perform a PHR per UE per eNB is configured or reconfigured by a higher layer except that disabling of a PHR is configured;

When uplink activation of a serving cell is configured, a PHR of an evolved Node B controlling the serving cell is triggered; and The UE has an uplink resource for transmission of new data, a PHR prohibitive timer for some eNB expires, and for any one activated serving cell, configured with the UL, controlled by the eNB, if there is uplink transmission or PUCCH transmission in the TTI, and a power fallback required since last PHR transmission is above the dl-PathlossChange in dB, then a PHR of an evolved Node B controlling the serving cell is triggered.

In the step 4: A PHR is reported:

A mechanism to report a PHR per UE per eNB is introduced. The PH information of the different eNBs is packaged in different PH MAC CEs to reflect only the PH information for all the aggregated activated serving cells controlled by the respective eNBs. After reporting the PH MAC CEs, the UE starts or restarts the periodicPHR-Timer per UE and the prohibitPHR-Timer per UE per eNB and cancels all the PHRs triggered.

Various corresponding formats of the PH MAC CEs may be designed according to the number of aggregated cells, the particular notification form of the relationship between the eNBs and the serving cells in the step 1 and other information, for example, by extending an existing extended PH MAC CE format or introducing a new Logic Channel ID (LCID). The PH information per UE per eNB is reported to the evolved Node B participating in aggregation when PHR information of the eNB is triggered and there is an uplink resource thereof to thereby avoid the PH information from being exchanged between the different evolved Node B's.

A particular reporting evolved Node B and a particular report resource may be selected in the following several schemes:

When the condition to trigger a PHR per UE per eNB is satisfied by at least one of serving cells controlled by some eNB at some instance of time and there is an active uplink resource of the eNB, the UE reports PH information for all the activated serving cells controlled by the eNB to the destination eNB; and When the condition to trigger a PHR per UE per eNB is satisfied by more than one of serving cells controlled by different eNBs at some instance of time and there is an active uplink resource of the eNB and there are active uplink resources of the corresponding eNBs, the UE reports PH information for all the activated serving cells controlled by the different eNBs respectively to the destination eNBs corresponding to the PH information.

The third scheme will be described below in details in an example:

A new mechanism to trigger a PHR (where a PHR per UE per eNB is triggered) where the UE reports PH information to eNBs participating in aggregation. The PH information reported by the UE may be the PH information of the network side apparatus or may be the PH information of the other network side apparatuses or may be the PH information corresponding to a part of the network side apparatuses or the PH information corresponding to all the network side apparatuses. When the UE reports the PH information for all the activated serving cells controlled by some evolved Node B through another evolved Node B, the PH information is passed to the destination evolved Node B through interaction via an interface between the evolved Node B's.

In the step 1, the UE is notified of a relationship between eNBs and serving cells serving the UE:

In the step 2, PHR parameters per UE are configured;

In the step 3, a PHR is triggered;

In the step 4, a PHR is performed;

Particularly all the steps 1 to 4 are performed as in the example of the second scheme except for the selection of a PHR report resource.

Particularly an evolved Node B making a PHR and a report resource may be selected in the following several schemes:

When the condition to trigger a PHR per UE per eNB is satisfied by at least one of serving cells controlled by some eNB, only PH information for all the activated serving cells controlled by the eNB is reported.

If there is an available uplink resource of the eNB in a period of time after a PHR is triggered, then the PHR information is reported to the eNB without being passed to the other evolved Node B's through interaction via interfaces therebetween;

Otherwise, if there is an available uplink resource of another evolved Node B serving the UE, then the PHR information is reported to the other eNB through interaction therewith via an interface therebetween; and When the condition to trigger a PHR per UE per eNB is satisfied by more than one of serving cells controlled by different eNBs, PH information for all the activated serving cells, controlled by the different evolved Node B's, corresponding to the respective evolved Node B's is reported respectively. An example will be presented where there are two evolved Node B's aggregated for the UE:

If there is an uplink resource of only one of the evolved Node B's in a period of time after a PHR of the two evolved Node B's is triggered, then two generated PH MAC CEs per eNB are reported to the one evolved Node B and passed to the destination evolved Node B through interaction between the evolved Node B's; or If there is an uplink resource of each of the two evolved Node B's in a period of time after a PHR is triggered, then two generated PH MAC CEs per eNB are reported respectively to the destination evolved Node B or still reported to one of the evolved Node B's and passed to the destination evolved Node B through interaction via an interface therebetween.

In the step 5, the PH information is exchanged.

If the UE fails to report the PHR information to the destination evolved Node B, then the PH information reported by the UE needs to be passed to the destination evolved Node B through interaction via the interface between the evolved Node B's. The PH information may be forwarded in the following several schemes:

The eNB forwards all the received PH information to the destination evolved Node B; and The eNB forwards only the PH information related to the destination evolved Node B among the received PH information to the evolved Node B.

Those skilled in the art shall appreciate that the embodiments of the invention may be embodied as a method, a system or a computer program product. Therefore the invention may be embodied in the form of an all-hardware embodiment, an all-software embodiment or an embodiment of software and hardware in combination. Furthermore the invention may be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram may be embodied in computer program instructions. These computer program instructions may be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions may also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions may also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept may make additional modifications and variations to these embodiments. Therefore the appended claims are intended to be construed as encompassing the preferred embodiments and all the modifications and variations coming into the scope of the invention.

Evidently those skilled in the art may make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of reporting power headroom, wherein the method comprises:

a user equipment for which resources of a plurality of network side apparatuses are aggregated determining power headroom information; and the user equipment transmitting the power headroom information to at least one of the network side apparatuses participating in aggregation, wherein before the user equipment transmits the power headroom information to at least one of the network side apparatuses participating in aggregation, the method further comprises:

the user equipment determining that a part or all the following conditions to trigger a power headroom report is or are satisfied:

the user equipment has an uplink resource for transmission of new data, a PHR prohibitive timer for one of the network side apparatuses expires, and there is at least one activated serving cell, controlled by the network side apparatus, with a path loss change exceeding a downlink path loss change;

a power headroom information report function per User Equipment (UE) per evolved Node B (eNB) is configured or reconfigured by a network side higher layer;

when uplink activation of a serving cell is configured, the power headroom information of a network side apparatus controlling the serving cell or the power headroom information for all the activated serving cells is triggered to be reported; and there is an uplink resource for transmission of new data, a PHR prohibitive timer for one of the network side apparatuses expires, and for any one activated serving cell, configured with the uplink (UL), controlled by the network side apparatus, if there is uplink transmission or Physical Uplink Control Channel (PUCCH) transmission over the serving cell, and a power fallback required since last transmission of power headroom information is above a threshold, then the power headroom information of the network side apparatus controlling the serving cell or the power headroom information for all the activated serving cells is triggered to be reported.

2. The method according to claim 1, wherein before the user equipment transmits the power headroom information to at least one of the network side apparatuses participating in aggregation, the method further comprises:

the user equipment determining the network side apparatuses participating in aggregation according to a correspondence relationship between aggregated serving cells and network side apparatuses.

3. The method according to claim 1, wherein the user equipment transmitting the power headroom information to at least one of the network side apparatuses participating in aggregation comprises:

the user equipment transmitting the power headroom information to one of the network side apparatuses participating in aggregation; or the user equipment transmitting the power headroom information to each of the network side apparatuses participating in aggregation.

4. The method according to claim 3, wherein the user equipment transmitting the power headroom information to at least one of the network side apparatuses participating in aggregation comprises:

after a Power Headroom Report (PHR) is triggered, the user equipment reporting the power headroom information via the first serving cell on which power headroom information can be carried; or after a serving cell controlled by a network side apparatus triggering a power headroom report has an available uplink resource, the user equipment reporting the power headroom information over the available uplink resource; or after a serving cell of a selected macro evolved Node B has an available uplink resource or a serving cell of a network side apparatus providing local coverage has an available uplink resource, the user equipment reporting the power headroom information over the available uplink resource; or after a serving cell controlled by a network side apparatus selected to perform uplink scheduling has an available uplink resource, the user equipment reporting the power headroom information over the available uplink resource; or if a condition to trigger a power headroom report is satisfied by at least one of serving cells of one of the network side apparatuses, and there has been no available uplink resource of the network side apparatus for a preset period of time after the condition to trigger a power headroom report is satisfied, then the user equipment reporting the power headroom information over an available uplink resource of another one network side apparatus participating in aggregation; or if the condition to trigger a power headroom report is satisfied by at least one of serving cells controlled by at least one of the plurality of network side apparatuses, and a part of the plurality of network side apparatuses has an available uplink resource, then the user equipment reporting the power headroom information over the available uplink resource of the part of the network side apparatuses.

5. The method according to claim 3, wherein the user equipment transmitting the power headroom information to at least one of the network side apparatuses participating in aggregation comprises:

when more than one of the network side apparatuses participating in aggregation has an uplink resource, the user equipment reporting the power headroom information sequentially to the network side apparatuses participating in aggregation.

6. The method according to claim 1, wherein the user equipment transmitting the power headroom information to at least one of the network side apparatuses participating in aggregation comprises:

for one of the network side apparatuses participating in aggregation, the user equipment transmitting the power headroom information for all the activated serving cells controlled by the network side apparatus to the network side apparatus.

7. The method according to claim 6, wherein the user equipment transmitting the power headroom information to at least one of the network side apparatuses participating in aggregation comprises:

if a condition to trigger a power headroom report is satisfied by at least one of serving cells of one of the network side apparatuses, and there is an available uplink resource of the network side apparatus, then the user equipment reporting the power headroom information for all the activated serving cells controlled by the network side apparatus to the network side apparatus over the available uplink resource, and if there has been no available uplink resource of the network side apparatus for a preset period of time after the condition to trigger a power headroom report is satisfied, then the user equipment reporting, the power headroom information for all the activated serving cells controlled by the network side apparatus, over an available uplink resource of another one network side apparatus participating in aggregation; or if the condition to trigger a power headroom report is satisfied by at least one of serving cells controlled by at least one of the plurality of network side apparatuses, and a part of the plurality of network side apparatuses has an available uplink resource, then the user equipment reporting, the power headroom information for all the activated serving cells of each of the network side apparatuses triggering a power headroom report among the plurality of network side apparatuses, over the available uplink resource of the part of the network side apparatuses; or if the condition to trigger a power headroom report is satisfied by at least one of serving cells controlled by at least one of the plurality of network side apparatuses, and each of the network side apparatuses triggering a power headroom report among the plurality of network side apparatuses has an available uplink resource, then the user equipment reporting the power headroom information for all the activated serving cells controlled by the network side apparatus respectively over the available uplink resource of the corresponding network side apparatus.

8. A method of reporting power headroom, wherein the method comprises:
   a network side apparatus receiving power headroom information reported by a user equipment for which resources of a plurality of network side apparatuses are aggregated; and
   the network side apparatus performing scheduling according to the power headroom information,
   wherein the network side apparatus comprises a base station or an evolved node B,
   wherein before the network side apparatus receives the power headroom information reported by the user equipment for which the resources of the plurality of network side apparatuses are aggregated, the method further comprises:
   the network side apparatus transmitting a correspondence relationship between aggregated serving cells and network side apparatuses to the user equipment, and
   wherein before the network side apparatus transmits the correspondence relationship between aggregated serving cells and network side apparatuses, the method further comprises:
   the network side apparatus obtaining the correspondence relationship between aggregated serving cells and network side apparatuses from another network side apparatus.

9. The method according to claim 8, wherein
   after the network side apparatus receives the correspondence relationship between aggregated serving cells and network side apparatuses, the method further comprises:
   the network side forwarding all the received power headroom information to the other network side apparatuses; or
   the network side forwarding the power headroom information related to the respective other network side apparatuses among the received power headroom information to the corresponding other network side apparatuses.

10. A user equipment for reporting power headroom, wherein the user equipment comprises:
    a processor configured to determine power headroom information after resources of a plurality of network side apparatuses are aggregated for the user equipment; and
    a signal transmitter configured to transmit the power headroom information to at least one of the network side apparatuses participating in aggregation,
    wherein the signal transmitter is further configured:
    to transmit the power headroom information to at least one of the network side apparatuses participating in aggregation upon determining that a part or all the following conditions to trigger a power headroom report is or are satisfied:
    there is an uplink resource for transmission of new data, a PHR prohibitive timer for one of the network side apparatuses expires, and there is at least one activated serving cell, controlled by the network side apparatus, with a PL change exceeding a dl-PathlossChange in dB;
    a power headroom information report function per UE per eNB is configured or reconfigured by a network side higher layer;
    when uplink activation of a serving cell is configured, the power headroom information of a network side apparatus controlling the serving cell or the power headroom information for all the activated serving cells is triggered to be reported; and
    there is an uplink resource for transmission of new data, a PHR prohibitive timer for one of the network side apparatuses expires, and for any one activated serving cell, configured with the UL, controlled by the network side apparatus, if there is uplink transmission or PUCCH transmission on the serving cell, and a power fallback required since last transmission of power headroom information is above a threshold, then the power headroom information of the network side apparatus controlling the serving cell or the power headroom information for all the activated serving cells is triggered to be reported.

11. The user equipment according to claim 10, wherein the signal transmitter is further configured:
    to determine the network side apparatuses participating in aggregation according to a correspondence relationship between aggregated serving cells and network side apparatuses before transmitting the power headroom information to at least one of the network side apparatuses participating in aggregation.

12. The user equipment according to claim 10, wherein the signal transmitter is further configured:
    to transmit the power headroom information for all the activated serving cells to one of the network side apparatuses participating in aggregation; or
    to transmit the power headroom information for all the activated serving cells to each of the network side apparatuses participating in aggregation.

13. The user equipment according to claim 12, wherein the signal transmitter is further configured:
    after a power headroom report is triggered, to report the power headroom information via the first serving cell on which power headroom information can be carried; or
    after a serving cell controlled by a network side apparatus triggering a power headroom report has an available uplink resource, to report the power headroom information over the available uplink resource; or
    after a serving cell of a selected macro evolved Node B has an available uplink resource or a serving cell of a network side apparatus providing local coverage has an available uplink resource, to report the power headroom information over the available uplink resource; or
    after a serving cell controlled by a network side apparatus selected to perform uplink scheduling has an available uplink resource, to report the power headroom information over the available uplink resource; or
    if a condition to trigger a power headroom report is satisfied by at least one of serving cells of one of the network side apparatuses, and there has been no available uplink resource of the network side apparatus for a preset period of time after the condition to trigger a power headroom report is satisfied, to report the power headroom information over an available uplink resource of another one network side apparatus participating in aggregation; or
    if the condition to trigger a power headroom report is satisfied by at least one of serving cells controlled by at least one of the plurality of network side apparatuses, and a part of the plurality of network side apparatuses has an available uplink resource, to report the power headroom information over the available uplink resource of the part of the network side apparatuses.

14. The user equipment according to claim 12, wherein the signal transmitter is further configured:

when more than one of the network side apparatuses participating in aggregation has an uplink resource, to report the power headroom information sequentially to the network side apparatuses participating in aggregation.

15. The user equipment according to claim 10, wherein the signal transmitter is further configured:

for one of the network side apparatuses participating in aggregation, to transmit the power headroom information for all the activated serving cells controlled by the network side apparatus to the network side apparatus.

16. The user equipment according to claim 15, wherein the signal transmitter is further configured:

if a condition to trigger a power headroom report is satisfied by at least one of serving cells of one of the network side apparatuses, and there is an available uplink resource of the network side apparatus, to report the power headroom information for all the activated serving cells controlled by the network side apparatus to the network side apparatus over the available uplink resource, and if there has been no available uplink resource of the network side apparatus for a preset period of time after the condition to trigger a power headroom report is satisfied, to report, the power headroom information for all the activated serving cells controlled by the network side apparatus, over an available uplink resource of another one network side apparatus participating in aggregation; or if the condition to trigger a power headroom report is satisfied by at least one of serving cells controlled by at least one of the plurality of network side apparatuses, and a part of the plurality of network side apparatuses has an available uplink resource, to report, the power headroom information for all the activated serving cells of each of the network side apparatuses triggering a power headroom report among the plurality of network side apparatuses, over the available uplink resource of the part of the network side apparatuses; or if the condition to trigger a power headroom report is satisfied by at least one of serving cells controlled by at least one of the plurality of network side apparatuses, and each of the network side apparatuses triggering a power headroom report among the plurality of network side apparatuses has an available uplink resource, to report the power headroom information for all the activated serving cells controlled by the network side apparatus respectively over the available uplink resource of the corresponding network side apparatus.

* * * * *